(12) United States Patent
Kaw et al.

(10) Patent No.: US 7,184,995 B2
(45) Date of Patent: Feb. 27, 2007

(54) DATA INTEROPERABILITY BETWEEN OPEN STANDARD DIRECTORY SERVICE AND PROPRIETARY DATABASE

(75) Inventors: Bindu Kaul Kaw, Cupertino, CA (US); Mark Christopher Smith, Saline, MI (US)

(73) Assignee: America Online Inc., Dulles, VA (US)

( * ) Notice: Subject to any disclaimer, the term of this patent is extended or adjusted under 35 U.S.C. 154(b) by 471 days.

(21) Appl. No.: 10/375,803

(22) Filed: Feb. 26, 2003

(65) Prior Publication Data
US 2004/0167866 A1 Aug. 26, 2004

(51) Int. Cl.
*G06F 17/30* (2006.01)
*G06F 15/177* (2006.01)

(52) U.S. Cl. ........................ 707/1; 707/3; 707/4; 707/8; 707/10; 707/102; 707/103 R; 707/104.1; 709/220

(58) Field of Classification Search ................ 707/1, 707/6, 10, 100, 102, 4, 103 R, 3, 8, 103, 707/104.1; 719/315; 705/39; 709/203, 709/217, 219, 220, 202, 225, 227, 228, 236
See application file for complete search history.

(56) References Cited

U.S. PATENT DOCUMENTS

| | | | | |
|---|---|---|---|---|
| 6,067,548 | A | 5/2000 | Cheng | 707/103 |
| 6,092,201 | A | 7/2000 | Turnbull et al. | 713/201 |
| 6,101,541 | A | 8/2000 | Ellesson et al. | 709/225 |
| 6,115,736 | A | 9/2000 | Devarakonda et al. | 709/202 |
| 6,154,743 | A * | 11/2000 | Leung et al. | 707/10 |
| 6,157,942 | A | 12/2000 | Chu et al. | 709/203 |
| 6,182,142 | B1 | 1/2001 | Win et al. | 709/229 |

(Continued)

FOREIGN PATENT DOCUMENTS

EP 955 761 11/1999

(Continued)

OTHER PUBLICATIONS

R. McGrath, Discovering and it Discontents: Discovery Protocols for Ubiquitos Computing, Presented at center for excellence in space data and information science, NASA Goddard Space Flight Center, Apr. 2000.*

(Continued)

*Primary Examiner*—Shahid Alam
*Assistant Examiner*—Fred I. Ehichioya
(74) *Attorney, Agent, or Firm*—Michael A. Glenn; Glenn Patent Group

(57) ABSTRACT

A method of providing interoperability between an open standard directory service and a proprietary database. The directory is represented as a mapping tree, consistent with directory service protocols such as X.500 or LDAP. The mapping tree node associated with the proprietary database is configured as a null suffix mapping tree entry, so that database mapping tree node replaces root of the mapping tree and the proprietary database the default backend of the directory service. The core server of the directory service is configured to recognize the null suffix mapping tree entry. All directory service operations are routed to a pre-operation plug-in that handles operations in the proprietary database, and remaining operations are redirected to the core server, preserving default functionality of the directory service. Normal data constraints are suspended for operations performed in the proprietary database.

18 Claims, 2 Drawing Sheets

U.S. PATENT DOCUMENTS

| | | | |
|---|---|---|---|
| 6,192,362 B1 | 2/2001 | Schneck et al. | 707/10 |
| 6,199,062 B1 | 3/2001 | Byrne et al. | 707/3 |
| 6,208,986 B1 | 3/2001 | Schneck et al. | 707/3 |
| 6,209,036 B1 | 3/2001 | Aldred et al. | 707/229 |
| 6,230,190 B1 | 5/2001 | Edmonds et al. | 709/213 |
| 6,330,560 B1 | 12/2001 | Harrison et al. | 707/8 |
| 6,332,163 B1 | 12/2001 | Bowman-Amuah | 709/231 |
| 6,343,287 B1 | 1/2002 | Kumar et al. | 707/4 |
| 6,345,239 B1 | 2/2002 | Bowman-Amuah | 703/6 |
| 6,345,266 B1 | 2/2002 | Ganguly et al. | 707/1 |
| 6,347,312 B1 | 2/2002 | Byrne et al. | 707/3 |
| 6,362,836 B1 | 3/2002 | Shaw et al. | 345/744 |
| 6,363,375 B1 | 3/2002 | Hoshino et al. | 707/3 |
| 6,366,954 B1 * | 4/2002 | Traversat et al. | 709/220 |
| 6,377,948 B2 | 4/2002 | Kikuchi et al. | 707/10 |
| 6,377,950 B1 | 4/2002 | Peters et al. | 707/10 |
| 6,408,306 B1 | 6/2002 | Byrne et al. | 707/104 |
| 6,415,323 B1 | 7/2002 | McCanne et al. | 709/225 |
| 6,427,132 B1 | 7/2002 | Bowman-Amuah | 703/22 |
| 6,751,797 B1 * | 6/2004 | Desgranges et al. | 719/315 |
| 6,877,026 B2 * | 4/2005 | Smith et al. | 709/203 |
| 2003/0041047 A1 * | 2/2003 | Chang et al. | 707/1 |

FOREIGN PATENT DOCUMENTS

| | | | |
|---|---|---|---|
| EP | 955761 A1 * | 11/1999 | |
| EP | 996 071 | 4/2000 | |
| EP | 1 126 681 | 8/2001 | |

OTHER PUBLICATIONS

Annie Chabert, Lightweight Directory Access Protocol quick study, Feb. 6, 1998, Report, pp. 1-7.*

Timothy A. Howes, The lightweight Directory Access Protol: X.500 Lite, Jul. 27, 1995, Citi Technical Report, pp. 1-9.*

*Integrating Network Devices in a Meta-Directory; The MetaComm Experience*: J. Freire, D. Lieuwen, J. Ordille; Information Systems, May 2002.

*MetaComm: A Meta-Directory for Telecommunications*; J. Freire, D. Lieuwen, J. Ordille, L. Garg, M. Holder, H. Urroz, G. Michael, J. Orbach, L. Tucker, Q. Ye, R. Arlein; Proceedings of 16th International Conference on Data Engineering; 2000.

*Making LDAP Active with the LTAP Gateway: Case Study in Providing Telecom Integration and Enhanced Services*; R. Arlein, J. Freire, N. Gehani, D. Lieuwen, J. Ordille.

*MetaComm: A Meta-Directory for Telecommunications*; J. Freire, D. Lieuwen, J. Ordille, L. Garg, M. Holder, H. Urroz, G. Michael, J. Orbach, L. Tucker, Q. Ye, R. Arlein.

*Custom vs. Vendor-Integrated COTS Software*; R. Seacord, K. Wallnau, S. Hissam.

IBM OS/390 *Security Server (RACF) Introduction*; Seventh Edition, Sep. 1999.

*A Generic LDAP Interface for a Telecommunication CORBA Application*; W. Radinger, M. Jandl, R.M. Liebhart, K.M. Goschka; Proceedings of the IASTED International Conference; Aug. 2001.

*Intranets*; A. Gaffin, M. Gibbs; Network World Journal; Feb. 1997.

*Ganymede: An Extensive and Customizable Directory Management Framework*; J. Abbey, M. Mulvaney; Proceedings of the Twelfth Systems Administration Conference; Dec. 1998.

*UPM: Unified Policy-Based Network Management*; K.L.E. Law, A. Saxena; Proceedings of the SPIE—The International Society for Optical Engineering; 2001.

*Design of SIP Transformation Server for Efficient Media Negotiation*; S. Pack, E.K. Paik, Y. Choi; Proceedings of the SPIE—The International Society for Optical Engineering; 2001.

*Design and Implementation of Secure Web-based LDAP Management System*; C.S. Yang, C.Y. Liu, J.H. Chen, C.Y. Sung; Proceedings 15th International Conference on Information Networking; 2001.

*Functional Integration Test of Mass Processes with Electronic Signatures in Public Administration*; B. Lupken, F. Losemann, T. Engel, C. Meinel; Proceedings of the 8th European Conference on Information Systems; Jul. 2000.

*Prototype Development of Directory Interface on Web Browser*; Seong Soon Yoon; Kisong Yoon; Changsoon Park; Danhyung Lee; Proceedings of the Seventeenth IASTED International Conference. Applied Informatics; Feb. 1999.

*Examining PerLDAP*; T. Neeriemer; Dr. Dobb's Journal; Apr. 1999.

*LDAP: The Glue is Almost Set*; S. Baker; UNIX Review's Performance Computing; Nov. 1998.

*Postage Paid: A Multi-Campus Community College Implements an Anytime, Anywhere E-Mail System*; Communications News; Apr. 1998.

*Access to an X.500 Directory Service Via ADSI Screen Phones*; M. Jadoul, D. Chantrain, A. Wuidart, S. De Smit; GLOBECOM 97. IEEE Global Telecommunications Conference. Conference Record; 1997.

*Architecture for a Grid Operation System*; K. Krauter, M. Maheswaran.

*Discovery and Its Discontents: Discovery Protocols for Ubiquitous Computing*; R. McGrath; Presented at Center for Excellence in Space Data and Information Science, NASA Goddard Space Flight Center; Apr. 2000.

*A Framework and Prototyping Environment for a W3 Security Architecture*; G. Neumann, S. Nusser; Proceedings of Communications and Multimedia Security, Joint Working Conference IFIP TC-6 and TC-11; Athens, Sep. 1997.

*Semantic Discovery for Ubiquitous Computing*; R. McGrath, M. D. Mickunas, R. Campbell; National Center for Supercomputing Applications, University of Illinois.

*UMTS Network Element Provisioning Tool*; G. Foley, S. Bowman; Adaptive Wireless Systems Group, Dept. of Electronic Engineering, Cork Institute of Technology, Cork, Ireland.

* cited by examiner

DATA INTEROPERABILITY BETWEEN OPEN STANDARD DIRECTORY SERVICE AND PROPRIETARY DATABASE

BACKGROUND OF THE INVENTION

1. Field of the Invention

The invention relates generally to directory services for data networks. More particularly, the invention relates to the provision of data interoperability between open standard directory services and proprietary databases.

2. Description of Related Art

LDAP (Lightweight directory access protocol) may be seen as a streamlined version of X.500, an open standards model for managing online directory services. Due to X.500 being designed for the OSI protocol, and the difficulty of implementing X.500 in smaller computer systems, LDAP, designed to run directly over the TCP/IP stack, was developed.

An LDAP directory service allows a user to locate organizations, individuals, and other resources such as files and devices, in a network, whether on the Internet or a corporate intranet. LDAP is both an information model and a protocol for querying it, employing a data and namespace model essentially identical to X.500. An LDAP directory is organized as a hierarchic tree, providing a 'root' at the top of the tree and branching out to, perhaps, 'countries,' 'organization,' 'organizational units,' and, finally, 'individuals.' An LDAP directory may be seamlessly distributed across many servers, and when an LDAP server receives a request, it takes responsibility for the request, passing to other servers as necessary, but providing a single, coordinated response to the user. Such homogeneity requires a data model that imposes rigid constraints. For example, every entry in an LDAP tree must either be a child, or it must be a suffix. Additionally, an LDAP tree is strictly object-oriented, in which each entry inherits all the attributes and properties of its parent. Unfortunately, data sources aren't always so homogenous. For example, a relational database consists of tables in various relationships to each other, not conforming at all to the object-oriented LDAP model. If a user attempted to direct a query to a relational database from an LDAP client, the LDAP server would simply return an error message. Nonetheless, there are many organizations, having databases in formats incompatible with LDAP, who would like to make them searchable from an LDAP client.

M. Morgenstern, *Integration platform for heterogeneous databases*, U.S. Pat. No. 5,979,490 (Oct. 19, 1999) employs an interoperability assistant to transform source data into a common, intermediate representation, and subsequently into a final, target representation. Thus, Morgenstern integrates heterogeneous data sources by porting the data to a new database in a target format. It would be desirable to provide a method of data interoperability without requiring creation of an entirely new database.

R. Kumar, P. Wechsler, *External data store link for a profile service*, U.S. Pat. No. 6,343,287 (Jan. 29, 2002) describes a method and system for integrating external data stores into a service application such as a profile service. Kumar, et al. provides an API (application programming interface) and SPI (service provider interface) that allows an application to access a variety of different naming and directory services. Plug-in service provider interfaces implement specific access protocols for the naming and directory services. Kumar doesn't contemplate the problem of accessing a proprietary database from an open standard directory service.

What is needed is a simple method of accessing a proprietary database from an open standards directory service that doesn't require the creation of new databases or addition of multiple extensions to the service. It would be desirable to make minor modifications to the directory tree that would preserve default functionality while allowing operations to be routed to an operation handler element, wherein operations for the proprietary database are handled by the handler element. It would be desirable to disable normal access control measures for operations directed to the external database, and it would also be extremely useful to free the pre-operation handler of normal data constraints, such as the requirement of a well-formed tree, thus allowing a search result to be seamlessly returned by the directory server, as though the proprietary database were an LDAP compatible directory.

SUMMARY OF THE INVENTION

The invention provides a method of providing interoperability between an open standard directory service and a proprietary database without requiring porting the database to a database in a new format, or providing numerous additional extensions and layers to the directory server or the client. The directory takes the form of a mapping tree, consistent with directory service protocols such as X.500 or LDAP. The mapping tree node associated with the proprietary database is configured as a null suffix mapping tree entry, so that the database mapping tree node replaces the root of the mapping tree and the proprietary database becomes the default backend of the directory service. The core server of the directory service is configured to recognize the null suffix mapping tree entry.

All directory service operations are routed to a executable object such as a pre-operation plug-in that handles operations in the proprietary database, and remaining operations are redirected to the core server, thus preserving default functionality of the directory service. The plug-in is invoked before data model constraints imposed by the open standard are applied by the server, so that operations are performed in the database even though the database doesn't conform to the constraints of the open standard data model. Access control checking is suspended for operations performed in the database by providing a flag to be set by the pre-operation handler plug-in. The plug-in is configured to ignore naming contexts reserved for the server's exclusive use, automatically routing operations for these sub trees to the server, thus preserving the server's default behavior, while providing the new functionality

DETAILED DESCRIPTION OF THE INVENTION

LDAP, short for Lightweight Directory Access Protocol, includes a set of protocols for accessing information in directories. LDAP will eventually make it possible for almost any application running on any computer platform to obtain directory information such as email address and public keys. Because LDAP is an open standard, the type of server hosting the directory is unimportant.

Figure 2:
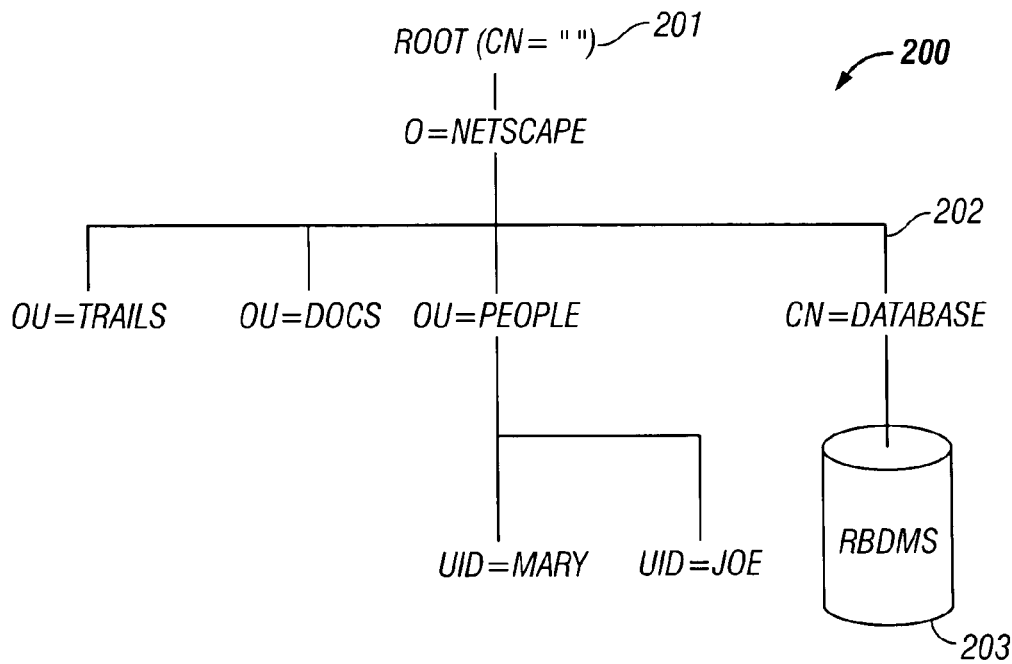
FIG. 2 provides a diagram of a conventional LDAP mapping tree.

However, the data sources searched must conform to the LDAP standard. An LDAP directory is organized in a tree hierarchy, with the root node at the top, as shown in FIG. 2. Each node of the tree must either be a suffix or must be a child node. In keeping with the principles of object-oriented design, each child node inherits the attributes and properties of its parent. The invention provides a method that enables data interoperability between an LDAP directory service and a proprietary database, wherein operations are routed to a pre-operation plug-in. Operations for the proprietary database are handled by the plug-in. All other operations are directed to the LDAP server for processing in the usual manner.

Modify Mapping Tree

Figure 1:
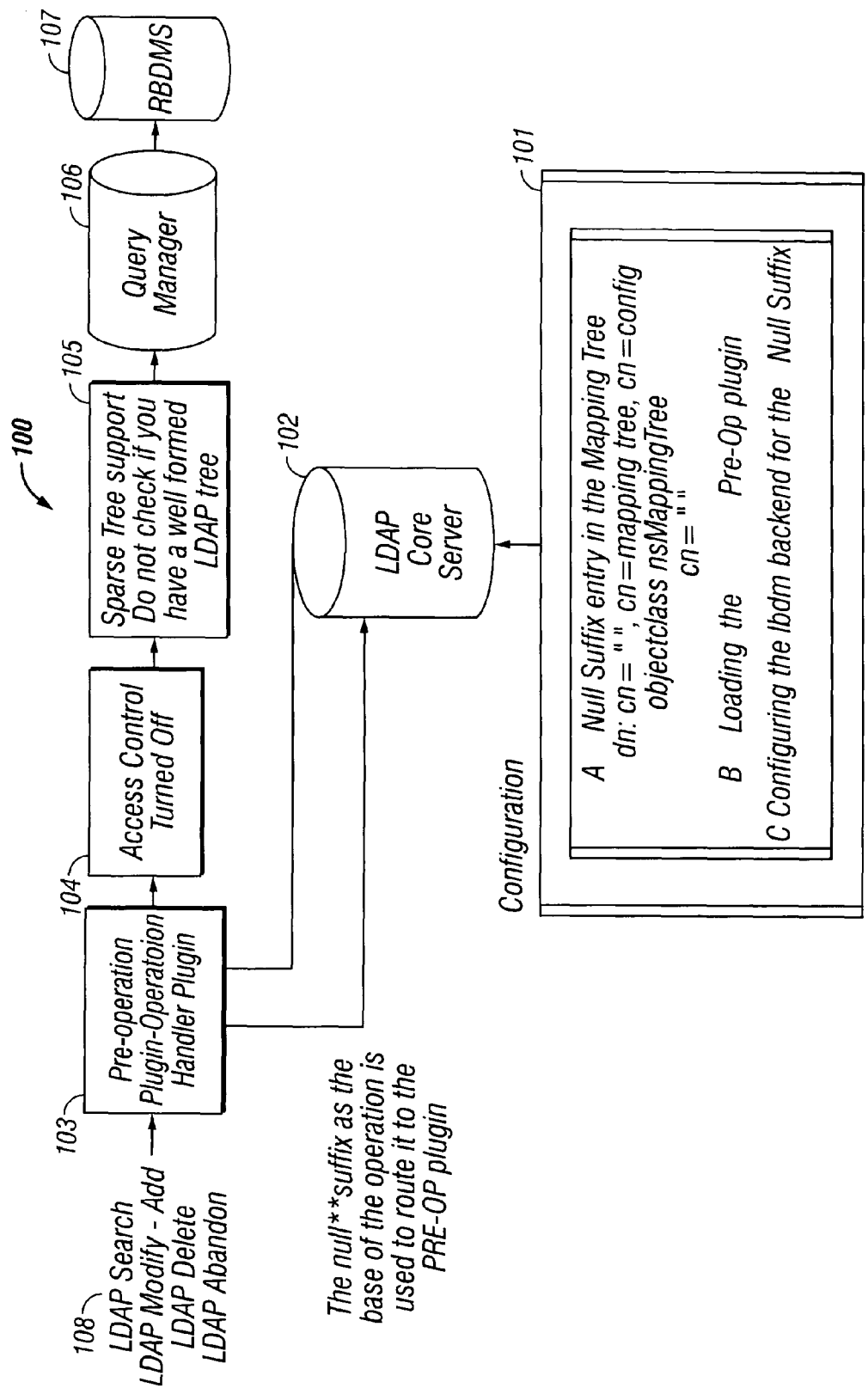
FIG. 1 provides a flow diagram of an LDAP directory service that routes operations to pre-operation plug-in to provide external database access, according to the invention.

FIG. 1 provides a flow diagram of the invented method 100. An LDAP directory service includes at least one server, conventionally referred to as a DSA (directory system agent). In the preferred embodiment, the at least one server constitutes a core server 102. As previously described, the server 102 uses a directory-based data structure 200, called a mapping tree, to support multiple backends and to distribute incoming requests to the correct backend databases. An exemplary LDAP mapping tree is shown in FIG. 2. Conventionally, there is a top-level node, the root 201, that is named by the zero length DN (distinguished name), cn (naming context)=""; sometimes called the null suffix. Ordinarily, the top level node designated by the null suffix is not an active node in which operations can normally be performed, beyond a base search on the root DSE (DSA specific entry), which returns naming contexts and extensions supported as shown below:

```
(1) ldapsearch –h trika.nscp.aoltw.net –D "cn=directory
manager" –w ..... –p 8887 –s base –b "" "objectclass=*"
version: 1
dn:
objectClass: top
namingContexts:
namingContexts: dc=nscp,dc=aoltw,dc=net
namingContexts: o=NetscapeRoot
supportedExtension: 2.16.840.1.113730.3.5.7
supportedExtension: 2.16.840.1.113730.3.5.8
```

Thus, the server 102 does not use the cn="" suffix as a repository or as a usable backend (database).

Figure 3:
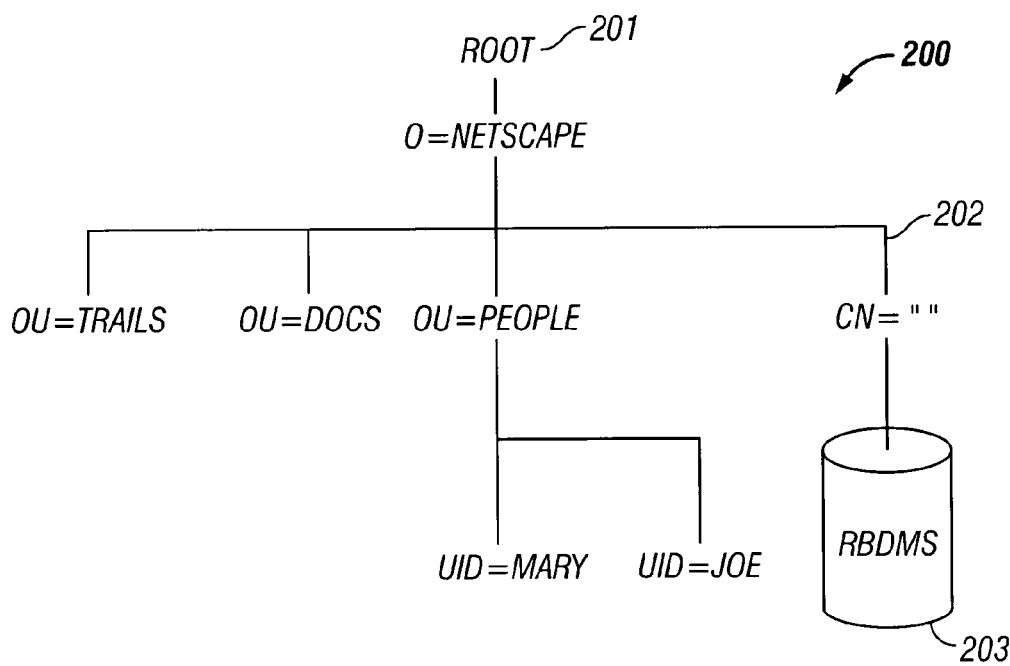
FIG. 3 provides a diagram of a modified mapping tree according to the invention.

As FIG. 2 shows, one of the sub-trees 202, designated by the naming context cn="database" is associated with an external relational database 203 in a proprietary format. In the preferred embodiment of the invention, the conventional mapping tree is modified as shown in FIG. 3 by assigning the null suffix to the sub-tree 202, which has the effect of designating the sub-tree 202 as the top level node, now an active node to which operations can be directed such as 'search,' or 'modify.'

Code for a procedure for modifying the mapping tree is shown below. This procedure is meant to be exemplary only. Other methods of modifying the mapping tree will be apparent to those skilled in the art of computer programming and are within the spirit and scope of the invention.

1) The null suffix entry in the mapping tree is flagged to the server through the value of the attribute nsslapd-state attribute. The nsslapd-state: container indicates to the Server that the node is designated as the null-suffix node. Presence of the value "container" in the mapping tree processing means that this entry replaces the root in the mapping tree.
2) The null suffix will get assigned to the "default" backend in the server.
In mapping_tree.c:
define MTN_CONTAINER /* This node represents a container for backends. */
    if (state == MTN_CONTAINER)
    {
      /* The "default" backend is used by the container node */
      be = defbackend_get_backend( );
/*and then subsequently is made the mapping_tree_root of the mapping tree.*/
if ( NULL != node && NULL == parent_node && tmp_ndn
        && ('\0' == *tmp_ndn )) {
/* The new node is actually the "" node. Replace the root node with this new one by copying all information (we can't free the root * node completely because children of the root * node hold pointers to it in their mtn_parent field).*/
      slapi_log_error( SLAPI_LOG_ARGS,
"mapping_tree_entry_add", "fix up NULL suffix\n" );
      node->mtn_children = mapping_tree_root->mtn_children;
      node->mtn_brother = mapping_tree_root->mtn_brother;
      *mapping_tree_root = *node; /* struct copy */
      slapi_ch_free( (void **)&node );
      node = mapping_tree_root;
    }
}
The null dn is described as:
/* Check if the target dn is '\0' - the null dn */
static int sdn_is_nullldn(const Slapi_DN *sdn){
    if(sdn) {
      const char *dn= slapi_sdn_get_dn(sdn);
      if(dn && ( '\0' == *dn)){
        return 1;
      }
    }
    return 0;
}
In mapping_tree.c, the functions slapi_mapping_tree_select( ) and slapi_mapping_tree_select_all( ) assign the backend to the LDAP operations and have been modified to support the null-suffix.

As described above, the end result of the above procedure, is that the sub-tree associated with the proprietary database is recognized as the root node and the proprietary database is recognized as the default backend, shown as steps 101a and 101c in FIG. 1.

Reconfigure Server and Load Plug-In

Additionally, the server 102 must be configured to recognize the null suffix and to load the data interoperability object 101b. In the preferred embodiment of the invention, the data interoperability object may be a pre-operation plug-in. The server's default configuration may be altered by running a script or a macro such as the PERL script below:

```
Add a null suffix mapping tree entry.
    dn: cn="", cn=mapping tree, cn=config
    objectClass: top
    objectClass: extensibleObject
    objectClass: nsMappingTree
    cn: ""
    nsslapd-state: container
        Add a data interoperability plug-in
        dn: cn=datainterop, cn=plugins, cn=config
        objectClass: top
        objectClass: nsSlapdPlugin
```

-continued

```
cn: datainterop
nsslapd-pluginPath: <server-
    root>/plugins/slapd/slapi/nullsuffix/libtest-plugin.so
nsslapd-pluginInitfunc: nullsuffix__init
nsslapd-pluginType: preoperation
nsslapd-pluginEnabled: on
nsslapd-pluginId: nullsuffix-search
nsslapd-pluginVersion: 6.1
nsslapd-pluginVendor: Netscape
nsslapd-pluginDescription: sample pre-operation null suffix
    search plugin
```

Thus, in modifying the server configuration, the server is informed as to the presence of the null-suffix node in the mapping tree. Additionally, specifying the data interoperability plug-in causes the plug-in 103 to be invoked for all operations, including those based at the null suffix.

The above script portion is meant to be exemplary only. Other methods of reconfiguring the server and specifying the plug-in will be apparent to those skilled in the art, and are within the spirit and scope of the invention.

Data Interoperability Plug-In

As described above, operations are routed to a data interoperability plug-in 103.

The data interoperability plug-in constitutes a pre-operation plug-in. Thus, it is invoked by the server prior to executing an LDAP operation. The plug-in constitutes an executable object that includes one or more functions called by the server before it executes an LDAP operation. As shown in FIG. 1, LDAP operations 108 include, but are not limited to:

Search;
Modify;
Delete; and
Abandon.

The data interoperability plug-in handles all operations intended for the proprietary database 107, and re-directs all other operations to be handled by the server, as described further below. One skilled in the art will appreciate the manner in which the data interoperability plug-in handles operations in the proprietary database is specific to the type of database. Accordingly, many different embodiments of the data interoperability plug-in are possible, each having functionality and corresponding code that is keyed to the type of data source accessed. As in the exemplary embodiment shown in FIG. 1, the data interoperability plug-in interfaces with the database 107 through a query manager 106. Additional functionalities of the data interoperability plug-in are described below.

Reserved Naming Contexts

As described above, it is essential that the server's default behavior be preserved, while providing the new data interoperability functionality. The server 102 must use a few top level naming contexts, or sub-trees, for configuration and management purposes, for example:

cn="config;"
cn="monitor;" and
cn="schema."

In addition, a base scope search on the root DSE entry must be handled by the server itself. Because the server requires that such naming contexts remain available for its own purposes, the data interoperability plug-in should not try to route operations for these reserved naming contexts to the proprietary database. Thus, the API for the plug-in includes functions to detect the reserved naming contexts, alerting them that they should allow the operation to proceed in the normal fashion without interception:

int slapi_op_reserved(Slapi_PBlock *pb).

The plug-in can use the function as shown below:

```
if ( slapi_op_reserved( pb)) {
    return 0;      /* let the server handle this operation */
```

Thus, operations in the reserved sub-trees are handled by the server 102 and not by the plug-in 103.

Access Control

LDAP provides its own access control model for providing data security within directories across servers. For the purposes of the invention, it is desirable to bypass the usual access control measures. Thus, the invention includes an extension to the data interoperability plug-in that suppresses access control checking 104.

The extension includes:

an operation flag in the header file for the plug-in:

```
#define SLAPI_OP_FLAG_NO_ACCESS_CHECK     0x10000
void slapi_operation_set_flag(Slapi_Operation *op, unsigned long flag)
void slapi_operation_clear_flag(Slapi_Operation *op,
unsigned long flag)
int slapi_operation_is_flag_set(Slapi_Operation *op,
unsigned long flag);
``` and API calls are added to the data structure for the operation:

```
/* Setting the flags on the operation allows more control to the plugin
 * to disable and enable checks
 * Flags that we support for setting in the operation from the plugin are
 * SLAPI_OP_FLAG_NO_ACCESS_CHECK -
   do not check for access control
 * This function can be extended to support other flag setting as well
 */
```

In routines that control access control plug-ins:

```
/* don't perform acl check for internal operations and if the plugin has
set it not to be checked */
            if (operation_is_flag_set (operation,
SLAPI_OP_FLAG_NO_ACCESS_CHECK|
OP_FLAG_INTERNAL|OP_
FLAG_REPLICATED|OP_FLAG_LEGACY_
REPLICATION_DN))
                    return LDAP_SUCCESS;
}
// success meaning that access is allowed.
        void slapi_operation_set_flag(Slapi_Operation *op,
        unsigned long flag)
                operation_set_flag(op, flag);
        }
```

Finally, in the code for the data interoperability plug-in:

```
Slapi_Operation *op;
if ( slapi_pblock_get( pb, SLAPI_OPERATION, &op ) != 0 ) {
    slapi_operation_set_flag( op, SLAPI_OP_FLAG_
        NO_ACCESS_CHECK );
} .
```

Sparse Tree Support

As previously indicated, LDAP requires a well-formed directory tree, in which every node is either a naming context or, if not a naming context, has a parent. Directories for external data sources may not conform to this constraint, often including dozens of top level naming contexts, or suffixes, that do not all fit together to form a tidy tree. For this reason, the data interoperability plug-in must have the option of not enforcing the usual LDAP requirement of a well-formed tree. The data interoperability plug-in is specifically designed not to enforce this constraint. By invoking the data interoperability plug-in before LDAP constraints are applied by the server, it is possible to provide sparse tree support without further modification to the server.

The invention has been described herein with respect to LDAP. Nonetheless, the invention would be equally applicable in other directory access protocols, for example X.500, or DNS (domain name service). Additionally, the principles of the invention find application in proprietary directory protocols as well. The invention is implemented using conventional methods of computer programming, well known to those skilled in the art. A variety of scripting and programming languages, PERL and JAVA for example, are suitable for implementing the invention. The various scripts and code samples provided herein describe exemplary embodiments of the invention. Other methods of implementing the principles of the invention will be apparent to the skilled practitioner.

The invention also takes the form of a computer program product includes computer-readable code embodied on a tangible medium or a carrier wave for performing the method herein described.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A computer-implemented method of providing interoperability between a LDAP (lightweight directory access protocol) directory service and a proprietary database comprising the steps of:
   configuring a node representing said proprietary database in a mapping tree for said LDAP directory service to replace root of said mapping tree and to replace default backend of said LDAP directory service with said proprietary database;
   configuring a core server of said LDAP directory service to recognize said mapping tree node representing said proprietary database as root of said mapping tree;
   routing all LDAP directory service operations to an object that handles operations in said proprietary database;
   recognizing naming contexts reserved for exclusive use of said core server by said object; and
   redirecting operations in these naming contexts to said corn server;
   wherein operations directed to said proprietary database by means of said LDAP directory service are acted on by said object and a result returned.

2. The method of claim 1, wherein said step of configuring said node representing said proprietary database comprises configuring said node as a null suffix mapping tree entry.

3. The method of claim 2, wherein said step of configuring said core server comprises configuring said core server to recognize said null suffix mapping tree entry.

4. The method of claim 1, further comprising the step of: suspending at least one data model constraint imposed by said LDAP for operations in said proprietary database, so that operations in said proprietary data base can be performed even if said proprietary database does not conform to said data model constraint.

5. The method of claim 4, wherein said at least one constraint comprises the requirement of a well-formed tree.

6. The method of claim 4, wherein said step of suspending at least one data model constraint imposed by said LDAP for operations in said proprietary database comprises invoking said plug-in before said constraints are applied by said core server.

7. The method of claim 1, further comprising the step of suspending access control checking far actions handled by said object.

8. The method of claim 7, said step of suspending access control checking comprising the steps of:
   providing a flag in a data structure of an operation to be handled by said object, wherein setting said flag disables access control; and
   setting said flag by said object.

9. The method of claim 1, wherein said object that handles operations in said proprietary database comprises a pre-operation plug-in.

10. A computer program product comprising computer readable code embodied on a tangible medium, said code including code means for performing the steps of a method of providing interoperability between a LDAP (lightweight directory access protocol) directory service and a proprietary database, the method comprising the steps of:
    configuring a node representing said proprietary database in a mapping tree for said LDAP directory service to replace root of said mapping tree and to replace default backend of said LDAP directory service with said proprietary database;
    configuring a core server of said LDAP directory service to recognize said mapping tree node representing said proprietary database as root of said mapping tree;
    routing all LDAP directory service operations to an object that handles operations in said proprietary database;
    recognizing naming contexts reserved for exclusive use of said core server by said object; and
    redirecting operations in these naming contexts to said core server
    wherein operations directed to said proprietary database by means of said LDAP directory service are acted on by said object and a result returned.

11. The method of claim 10, wherein said step of configuring said node representing said proprietary database comprises configuring said node as a null suffix mapping tree entry.

12. The method of claim 11, wherein said step of configuring said core server comprises configuring said core server to recognize said null suffix mapping tree entry.

13. The method of claim 10, further comprising the step of:
    suspending at least one data model constraint imposed by said LDAP for operations in said proprietary database, so that operations in said proprietary data base can be performed even if said proprietary database does not conform to said data model constraint.

14. The method of claim 13, wherein said at least one constraint comprises the requirement of a well-formed tree.

15. The method of claim 13, wherein said step of suspending at least one data model constraint imposed by said LDAP for operations in said proprietary database comprises invoking said object before said constraints are applied by said core server.

16. The method of claim 10, further comprising the step of suspending access control checking for actions handled by said object.

17. The method of claim 16, said step of suspending access control checking comprising the steps of:
   providing a flag in a data structure of an operation to be handled by said object, wherein setting said flag disables access control; and
   setting said flag by said object.

18. The method of claim 10, wherein said object that handles operations in said proprietary database comprises a pre-operation plug-in.

* * * * *